H. R. RICARDO.
MEANS FOR HEATING THE CHARGES IN INTERNAL COMBUSTION ENGINES.
APPLICATION FILED NOV. 11, 1919.
1,342,869. Patented June 8, 1920.
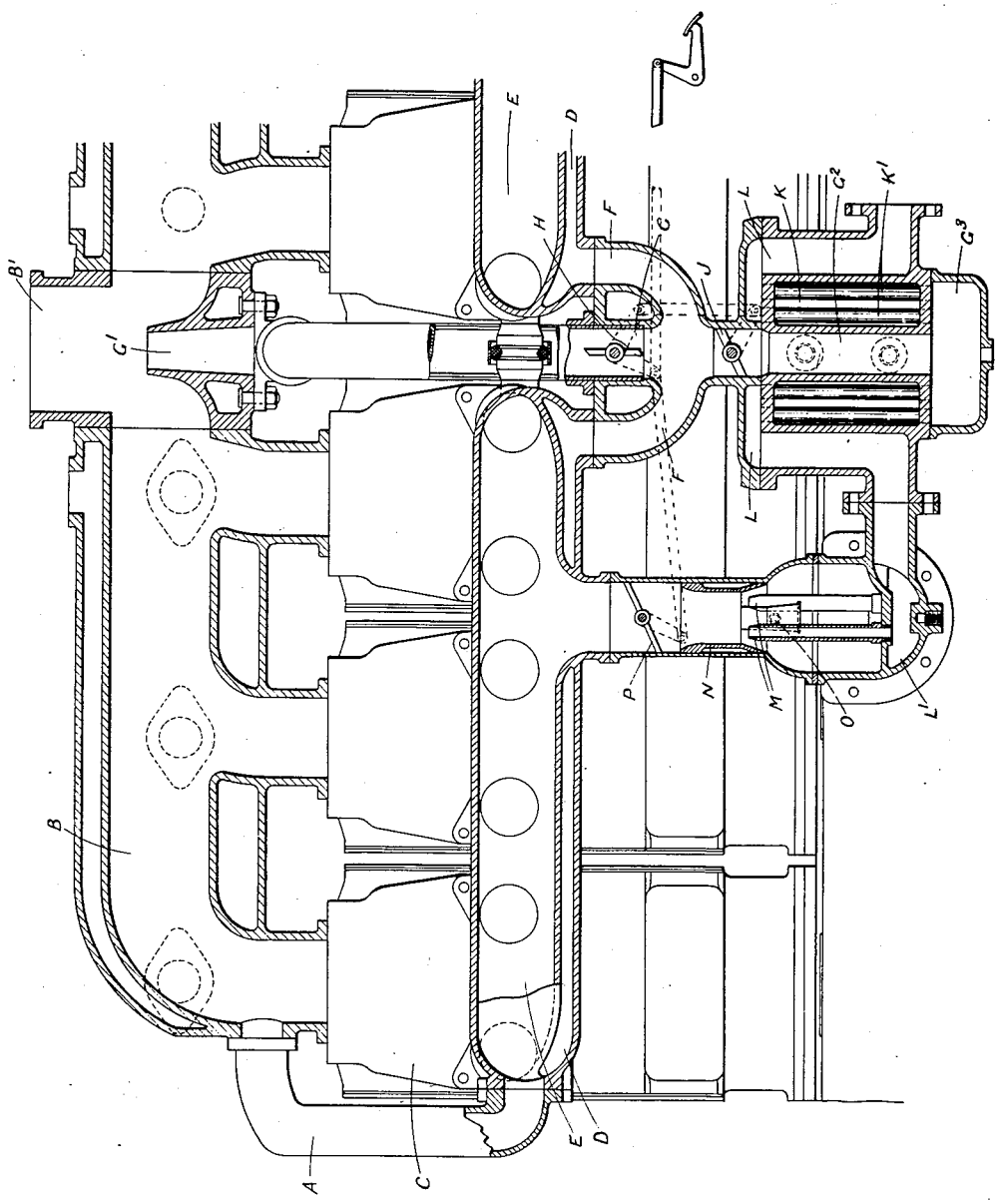
Inventor.
H. R. Ricardo,
By Foster, Freeman, Watson & Coit,
Attorneys.

UNITED STATES PATENT OFFICE.

HARRY RALPH RICARDO, OF LONDON, ENGLAND.

MEANS FOR HEATING THE CHARGES IN INTERNAL-COMBUSTION ENGINES.

1,342,869. Specification of Letters Patent. Patented June 8, 1920.

Application filed November 11, 1919. Serial No. 337,195.

*To all whom it may concern:*

Be it known that I, HARRY RALPH RICARDO, a subject of the King of England, and resident of London, England, have invented certain new and useful Improvements in Means for Heating the Charges in Internal-Combustion Engines, of which the following is a specification.

This invention relates to internal combustion engines employing paraffin or like heavy fuel and more particularly multi-cylinder engines which are provided with carbureters designed for using a lighter fuel such as petrol and has for its object to insure proper vaporization of the fuel and prevent knocking.

In an engine running on paraffin, and especially if it is provided with a carbureter which has primarily been designed for petrol, it is necessary to provide additional heat to the induction piping in order to prevent precipitation of the fuel. Further when working with a relatively high compression it is desirable in such engines to provide for the addition of a certain quantity of cooled exhaust gas to the carbureter in order to prevent detonation or knocking. When working on full load owing to the high velocity of the gas in the induction system precipitation of the particles of fuel is less likely to occur and consequently less heat is required, but on the other hand when running on full load the maximum quantity of cooled exhaust gas is required to enter the carbureter.

According to this invention a by-pass is carried from the exhaust manifold to a jacket which wholly or partially surrounds the induction pipe or manifold into which the fuel enters past a throttle valve from a choke tube into which it is delivered by one or more jets. Two branch pipes lead from this jacket respectively to the exhaust and to one or more jets which are disposed adjacent to the fuel jet or jets. The flow of products of combustion through these branch pipes is controlled by either a three-way cock or two valves to which the main throttle is connected. The second branch pipe through which the inert gas is conveyed to the jets leads from the jacket to a cooled chamber which conveniently comprises a series of pipes for the gas which passes through a water jacket. The connections between the main throttle valve and the three-way cock or the two valves which are preferably provided in the branch pipes are such that as the throttle is opened the valve in the pipe leading to the exhaust will tend to close while the valve in the second branch pipe will tend to open when cooled inert gas will be delivered into the choke tube. Thus on light loads when the maximum of heat is required in the jackets the exhaust is allowed to escape freely after passing through the jackets but as the main throttle valves are opened and the load is increased the free escape of the exhaust gases is checked by the partial closing of the outlet and a portion of the gases is directed into the cooled receiver and from there is pased to the supplementary jets fitted in the choke tube of the carbureter. On full load the outlet throttle is closed completely and the whole of the exhaust through the by-pass pipe passes to the cooler and the carbureter, the actual quantity so passed being controlled by the size of the jets and the suction upon them. Thus on light loads the exhaust can pass freely through the jackets on the induction system, but on full load the quantity so passed is reduced to that which can subsequently be passed through the supplementary jets in the carbureter.

The invention may be carried out in practice in various ways but the accompanying drawing illustrates in vertical sectional elevation one construction which may conveniently be adopted for example in a multi-cylinder engine having the cylinders arranged in two groups each of which is provided with a separate carbureter. The drawing shows one of these groups and the section is taken through the exhaust and induction manifolds and inlet pipe.

A pipe A leads from a suitable point in the main exhaust pipe or manifold B of each group of cylinders C to one end of a jacket D which preferably lies around the lower part of the main induction pipe or manifold E since it is along the lower wall of this induction pipe that the fuel will tend to collect. From the opposite end of the jacket D a short pipe F extends downward and turns laterally into one side of a vertical pipe G the upper end of which terminates preferably in a nozzle G' which is disposed in the delivery end B' of the exhaust manifold B. The connecting pipes F from the jackets D of the induction pipes of the two cylinder groups are conveniently led opposite each other into the pipe G. In the latter and above this point of entry is a valve H of suitable type. Below this point of entry a second valve J is arranged in the pipe G and beyond the valve this pipe extends downward as at G² through a water jacket K. At its end the pipe G² opens into a chamber G³ whence pipes K' lead upward through the water jacket K and the upper ends of these pipes open into two passages L. Each of these passages L runs to a small chamber L' formed in the base of a carbureter whence jets M lead upward and terminate in a choke tube N. A fuel jet O is disposed between these cooled exhaust gas jets M the orifice of the fuel jet being arranged preferably below those of the jets M. Air can enter around the jet tubes.

Above the choke tube N lies the main throttle valve P and this is interconnected in some convenient manner with the two valves H and J in the vertical exhaust gas pipe G. These valves are so arranged that the upper one H will be open and the second or lower one J closed, when the main throttle P is closed, but when the latter is opened the lower valve J will open and allow some inert gas to pass through the cooling chamber G³ to the jets M, while the upper valve H will then close. The free flow of exhaust gas through the jacket D around the induction pipe will then be checked and consequently less heat will be supplied to this pipe.

The details of construction may be modified to meet requirements and the type and structure of the engine to which the invention is applied.

What I claim as my invention and desire to secure by Letters Patent is:—

1. In an internal combustion engine employing a relatively heavy fuel such as paraffin the combination of an induction pipe, a choke tube through which combustible mixture is delivered into the induction pipe, means for delivering fuel into the choke tube, a throttle valve controlling the delivery of combustible mixture into the cylinders and situated adjacent to the choke tube, an exhaust pipe, a jacket chamber against the wall of the induction pipe, a by-pass leading from the exhaust pipe to the jacket chamber, a passage leading from this jacket chamber back into the exhaust pipe at a point toward the delivery end of the latter, a second passage leading from the jacket to a point adjacent to the choke tube where this passage is provided with means for delivering gases into the choke tube, means for controlling the flow of products of combustion which pass from the exhaust pipe through the jacket and respectively through the two passages leading therefrom, and means for simultaneously operating the throttle as set forth.

2. In an internal combustion engine employing a relatively heavy fuel such as paraffin the combination of an induction pipe, a choke tube through which combustible mixture is delivered into the induction pipe, means for delivering fuel into the choke tube, a throttle valve controlling the flow of combustible mixture to the cylinders and situated adjacent to the choke tube, an exhaust pipe, a jacket which partially surrounds the induction pipe, a by-pass leading from the exhaust pipe to the jacket, a passage leading from this jacket back into the exhaust pipe at a point toward the delivery end of the latter, a plurality of jets delivering into the choke tube, a second passage leading from the jacket to these jets, means for controlling the flow of products of combustion from the exhaust pipe through the jacket and respectively through the two passages leading therefrom, and means for simultaneously operating the throttle as set forth.

3. In an internal combustion engine employing a relatively heavy fuel such as paraffin the combination of an induction pipe, a choke tube through which combustible mixture is delivered into the induction pipe, means for delivering fuel into the choke tube, a throttle valve controlling the delivery of combustible mixture into the cylinders and situated adjacent to the choke tube, an exhaust pipe, a jacket chamber against the wall of the induction pipe, a by-pass leading from the exhaust pipe to the jacket chamber, a passage in which is a valve leading from this jacket back into the exhaust pipe at a point toward the delivery end of the latter, a second passage in which is a valve leading from the jacket to a point adjacent to the choke tube where this passage is provided with means for delivering gases into the choke tube, means for controlling the valves in these two passages so that as one valve is opened the other is closed, and means for simultaneously operating the throttle as set forth.

4. In an internal combustion engine employing a relatively heavy fuel such as paraffin the combination of an induction pipe, a choke tube through which combustible mixture is delivered into the induction pipe, means for delivering fuel into the choke tube, a throttle valve controlling the delivery of combustible mixture into the cylinders and situated adjacent to the choke tube, an exhaust pipe, a jacket chamber against the wall of the induction pipe, a by-pass leading from the exhaust pipe to the jacket chamber, a passage leading from this jacket chamber back into the exhaust pipe at a point toward the delivery end of the latter, a second passage leading from the jacket to a point adjacent to the choke tube where this passage is provided with means for delivering gases into the choke tube, means for cooling the gases passing through the second passage and before they are delivered into the choke tube, means for controlling the flow of products of combustion which pass from the exhaust pipe through the jacket and respectively through the two passages leading therefrom, and means for simultaneously operating the throttle as set forth.

5. In an internal combustion engine employing a relatively heavy fuel such as paraffin the combination of an induction pipe, a choke tube through which combustible mixture is delivered into the induction pipe, means for delivering fuel into the choke tube, a throttle valve controlling the delivery of combustible mixture into the cylinders and situated adjacent to the choke tube, an exhaust pipe, a jacket chamber against the wall of the induction pipe, a by-pass leading from the exhaust pipe to the jacket chamber, a passage leading from this jacket back into the exhaust pipe at a point toward the delivery end of the latter, a cooled chamber, a second passage leading from the jacket to this cooled chamber, a passage leading from the cooled chamber to a point adjacent to the choke tube where this passage is provided with means for delivering gases into the choke tube, means for controlling the flow of products of combustion from the exhaust pipe through the jacket and respectively through the two passages leading therefrom, and means for simultaneously operating the throttle as set forth.

6. In an internal combustion engine employing a relatively heavy fuel, such as paraffin the combination of an induction pipe, a choke tube through which combustible mixture is delivered into the induction pipe, means for delivering fuel into the choke tube, a throttle valve controlling the delivery of combustible mixture into the cylinders and situated adjacent to the choke tube, an exhaust pipe, a jacket chamber against the wall of the induction pipe, a by-pass leading from the exhaust pipe to the jacket chamber, a passage in which is a valve leading from this jacket back into the exhaust pipe at a point toward the delivery end of the latter, a cooled chamber, a second passage in which is a valve leading from the jacket to this cooled chamber, a passage leading from the cooled chamber to a point adjacent to the choke tube where this passage is provided with means for delivering gases into the choke tube, means for controlling the valves in these two passages so that when one valve is opened the other is closed, and means for simultaneously operating the throttle as set forth.

7. In an internal combustion engine employing a relatively heavy fuel such as paraffin the combination of an induction pipe, a choke tube through which combustible mixture is delivered into the induction pipe, a jet delivering fuel into the choke tube, a throttle valve controlling the delivery of combustible mixture into the cylinders and situated adjacent to the choke tube, an exhaust pipe, a jacket which partially surrounds the induction pipe, a by-pass leading from the exhaust pipe to the jacket, a passage in which is a valve leading from this jacket back into the exhaust pipe at a point toward the delivery end of the latter, a cooled chamber, a second passage in which is a valve leading from the jacket to this cooled chamber, a plurality of jets delivering into the choke tube, a passage leading from the cooled chamber to these jets, means for controlling the valves in the two passages so that as one valve is opened the other is closed, and means for simultaneously operating the throttle as set forth.

In testimony whereof I have signed my name to this specification.

HARRY RALPH RICARDO.